(12) United States Patent
Sakamoto

(10) Patent No.: US 10,137,858 B2
(45) Date of Patent: Nov. 27, 2018

(54) VEHICLE-MOUNTED DEVICE

(71) Applicant: DENSO CORPORATION, Kariya, Aichi-pref. (JP)

(72) Inventor: Koji Sakamoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 57 days.

(21) Appl. No.: 15/515,584

(22) PCT Filed: Oct. 8, 2015

(86) PCT No.: PCT/JP2015/005109
§ 371 (c)(1),
(2) Date: Mar. 29, 2017

(87) PCT Pub. No.: WO2016/063476
PCT Pub. Date: Apr. 28, 2016

(65) Prior Publication Data
US 2017/0297531 A1 Oct. 19, 2017

(30) Foreign Application Priority Data

Oct. 21, 2014 (JP) .................................. 2014-214656

(51) Int. Cl.
*B60R 25/24* (2013.01)
*B60R 25/01* (2013.01)
(Continued)

(52) U.S. Cl.
CPC .............. *B60R 25/24* (2013.01); *B60R 25/01* (2013.01); *E05B 81/58* (2013.01); *E05B 81/70* (2013.01);
(Continued)

(58) Field of Classification Search
CPC ..... B60R 25/24; B60R 25/01; G07C 9/00309; G07C 9/00; G07C 2209/63;
(Continued)

(56) References Cited

U.S. PATENT DOCUMENTS

2007/0191998 A1* 8/2007 Arie ...................... B60R 25/246
701/2

FOREIGN PATENT DOCUMENTS

JP 2012087534 A 5/2012

* cited by examiner

*Primary Examiner* — Yuen H Wong
(74) *Attorney, Agent, or Firm* — Harness, Dickey & Pierce, P.L.C.

(57) ABSTRACT

In a vehicle-mounted device, a first time period measuring unit starts measurement of a first time period when detecting an exit movement of a user. Before an elapse of the first time period, a vehicle side transmission unit periodically transmits a response request signal at a predetermined transmission period; and a locking and unlocking control unit keeps a door unlocked while receiving a response signal, locks the door when incapable of receiving the response signal, and keeps the door unlocked when capable of receiving the response signal at the elapse of the first time period. After the first time period is elapsed, the vehicle side transmission unit periodically transmits the response request signal at a second time period; and the locking and unlocking control unit keeps the door unlocked while receiving the response signal, and locks the door when incapable of receiving the response signal.

6 Claims, 2 Drawing Sheets

(51) Int. Cl.
*E05B 81/58* (2014.01)
*E05B 81/70* (2014.01)
*E05B 83/36* (2014.01)
*G07C 9/00* (2006.01)

(52) U.S. Cl.
CPC ............... *E05B 83/36* (2013.01); *G07C 9/00* (2013.01); *G07C 9/00309* (2013.01); *G07C 2009/00769* (2013.01); *G07C 2209/08* (2013.01); *G07C 2209/63* (2013.01)

(58) Field of Classification Search
CPC ...... G07C 2209/08; G07C 2009/00769; E05B 83/36; E05B 81/70; E05B 81/58
See application file for complete search history.

VEHICLE-MOUNTED DEVICE

CROSS REFERENCE TO RELATED APPLICATIONS

This application is a U.S. National Phase Application under 35 U.S.C. 371 of International Application No. PCT/JP2015/005109 filed on Oct. 8, 2015 and published in Japanese as WO 2016/063476 A1 on Apr. 28, 2016. This application is based on and claims the benefit of priority from Japanese Patent Application No. 2014-214656 filed on Oct. 21, 2014. The entire disclosures of all of the above applications are incorporated herein by reference.

TECHNICAL FIELD

The present disclosure relates to a vehicle-mounted device that executes a matching process by performing a wireless communication with a mobile terminal carried by a user and controls locking and unlocking of doors of a vehicle on the basis of a result of the matching process.

BACKGROUND ART

Up to now, an electronic key system that executes various controls such as locking and unlocking doors on the basis of a successful matching performed based on a wireless communication between a vehicle-mounted device and a mobile terminal or a matching failure has been known.

As the above-described electronic key system, a system may be configured as follows. In a situation where all of the doors of a vehicle are in closed state and at least one door is in unlocked state, when the mobile terminal moves out of a wireless communication range of the vehicle-mounted device, all of the doors are locked automatically. Hereinafter, for description convenience, a system in which all of the doors are automatically locked when the mobile terminal moves out of the wireless communication range of the vehicle-mounted device is referred to as an automatic locking system.

The vehicle-mounted device of the electronic key system employing the automatic locking system sequentially transmits signals to the mobile terminal at a predetermined transmission period, and determines that the mobile terminal moves out of the wireless communication range of the vehicle-mounted device when the vehicle-mounted device can no longer receive a response to the signals transmitted from the mobile terminal. Therefore, in the electronic key system employing the automatic locking system, the transmission and reception of the signals are sequentially executed between the vehicle-mounted device and the mobile terminal for the purpose of determining whether the mobile terminal moves out of the wireless communication range or not.

Patent Literature 1 discloses a configuration in which a sensor that detects user's intentional operation (unlocking operation) for not automatically locking the door even when the mobile terminal moves out of the wireless communication range. In Patent Literature 1, the sensor is disposed in a vicinity of each door handle. In the electronic key system of Patent Literature 1, when an unlocking operation made by the user is detected by the sensor, the automatic locking of the doors is not carried out. As a result, the above configuration can reduce the likelihood of unintentional door locking which is against user's intention.

PRIOR ART LITERATURE

Patent Literature

[Patent Literature 1] JP 2012-87534 A

SUMMARY OF INVENTION

It is an object of the present disclosure to provide a vehicle-mounted device capable of suppressing a period of time during which a vehicle is left with one or more doors unlocked and suppressing a power consumption of a mobile terminal. The vehicle-mounted device is provided for an electronic key system equipped with an automatic locking function.

According to an aspect of the present disclosure, a vehicle-mounted device equipped to a vehicle includes a vehicle side transmission unit that transmits, to a mobile terminal carried by a user, a response request signal requesting for a response, a vehicle side receiving unit that receives a response signal transmitted from the mobile terminal as the response to the response request signal, an exit movement detection unit that detects an exit movement of the user, a locking and unlocking control unit that controls locking and unlocking of a door of the vehicle, and a first time period measuring unit that measures a first time period preliminarily set to be longer than an estimated time period required for the user to leave a periphery of the vehicle after exiting from the vehicle. The first time period measuring unit starts a measurement of the first time period at a time point when the exit movement of the user is detected by the exit movement detection unit as a counting start time. Before an elapse of the first time period, the vehicle side transmission unit periodically transmits the response request signal at a transmission period that is preliminarily set, the locking and unlocking control unit keeps the door in an unlocked state while the vehicle side receiving unit receives the response signal, the locking and unlocking control unit locks the door when the vehicle side receiving unit is incapable of receiving the response signal, and the locking and unlocking control unit keeps the door in the unlocked state when the vehicle side receiving unit is capable of receiving the response signal at a time point corresponding to the elapse of the first time period. After the elapse of the first time period, the vehicle side transmission unit periodically transmits the response request signal at a second time period which is set to be longer than the transmission period, the locking and unlocking control unit keeps the door in the unlocked state while the vehicle side receiving unit receives the response signal, and the locking and unlocking control unit locks the door when the vehicle side receiving unit is incapable of receiving the response signal.

In the above configuration, the vehicle-mounted device successively executes the transmission and reception of the signals with the mobile terminal as a communication partner at a predetermined transmission period until the first time period elapses after the user's exit movement is detected, and then successively executes the transmission and reception of the signals with the mobile terminal as the communication partner at a second time period. The second time period used as the transmission interval is longer than the predetermined transmission period. At the time point when the vehicle-mounted device no longer receives the response signal from the mobile terminal, the locking and unlocking control unit locks the door.

In this example, the first time period is set to be longer than an estimated time period required for the user leaves a periphery of the vehicle after getting off the vehicle. Normally, there is no reason for the user to stay around the vehicle after exiting from the vehicle, thus the user leaves from the periphery of the vehicle within the first time period. In other words, when there is no reason for the user to stay around the vehicle, the response signal is not returned from the mobile terminal within the first time period, and the door is promptly locked.

When the response signal returns from the mobile terminal even when the first time period has elapsed after the user's exit movement from the vehicle, the returning of the response signal indicates that the user intends to stay around the vehicle. In that case, when the response request signal is still successively transmitted at the transmission period as in the conventional art, the mobile terminal returns the response signal in response to each transmission signal, and therefore the power consumption of the mobile terminal is increased.

In the above configuration, after the first time period has elapsed, the response request signals are successively transmitted at the second time period, which is longer than the transmission period. In this configuration, since a frequency at which the mobile terminal returns the response signal can be suppressed, the power consumption of the mobile terminal can be suppressed.

Further, because the response request signals are successively transmitted at the second time period after the elapse of the first time period, even when the user leaves from the periphery of the vehicle after an elapse of the first time period, a period of time during which the vehicle is left with the doors unlocked is equal to or shorter than the second time period. In other words, the period of time during which the vehicle is left with one or more doors unlocked can be suppressed compared with an assumed configuration.

In the above configuration, the user's operation for keeping the door unlocked is not required. Because there is no need to provide the vehicle-mounted device with the sensor for detecting the user's operation (that is, unlocking operation) for keeping the door in the unlocked state, the configuration of the vehicle-mounted device can be simplified as compared with the configuration of Patent Literature 1. In addition, because there is no need to execute the unlocking operation, the user's convenience can be enhanced.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

In a conventional electronic key system employing an automatic locking system, a communication for determining whether a mobile terminal moves out of a wireless communication range or not, is successively executed (for example, every 200 milliseconds). For that reason, for example, when the user stays in the vicinity of the vehicle for a relatively long time due to a refueling work or a standing talking with a friend, the power consumption of the mobile terminal increases. In the present description, the vehicle periphery refers to an area within a wireless communication range of a vehicle-mounted radio device but outside of a vehicle compartment.

According to the configuration of Patent Literature 1, once the unlocking operation is accepted, the communication for determining whether the mobile terminal has moved out of the wireless communication range or not, is not performed. For that reason, when the user remembers to perform the unlocking operation while the user stays within the vehicle periphery, the power consumption of the mobile terminal 2 can be suppressed. However, when the user stays around the vehicle, the user does not always remember to perform the unlocking operation. When the unlocking operation is not performed by the user while the user stays around the vehicle, the power of the mobile terminal is consumed as in the conventional electronic key system employing the automatic locking system.

As one solution to the above-described difficulty, the following configuration (also referred to as an assumed configuration) may be conceivable. In this configuration, a timer is used to terminate the communication for determining whether the mobile terminal has moved out of the wireless communication range or not. In this configuration, process for automatically locking the doors is canceled when the user continuously stays around the vehicle for a predetermined period of time or longer.

However, in the above assumed configuration, there is a possibility that the user may leave the periphery of the vehicle without noticing that the communication process for automatically locking the doors has been canceled. In such a case, the doors are left in the unlocked state until the user returns to the vehicle again. This is not preferable from the viewpoint of security and crime prevention.

The present disclosure is made in view of the above difficulties, and provides a vehicle-mounted device for an electronic key system equipped with an automatic locking function. The vehicle-mounted device is capable of suppressing a period of time during which a vehicle is left with one or more doors unlocked, and is also capable of suppressing a power consumption of a mobile terminal.

Figure 1:
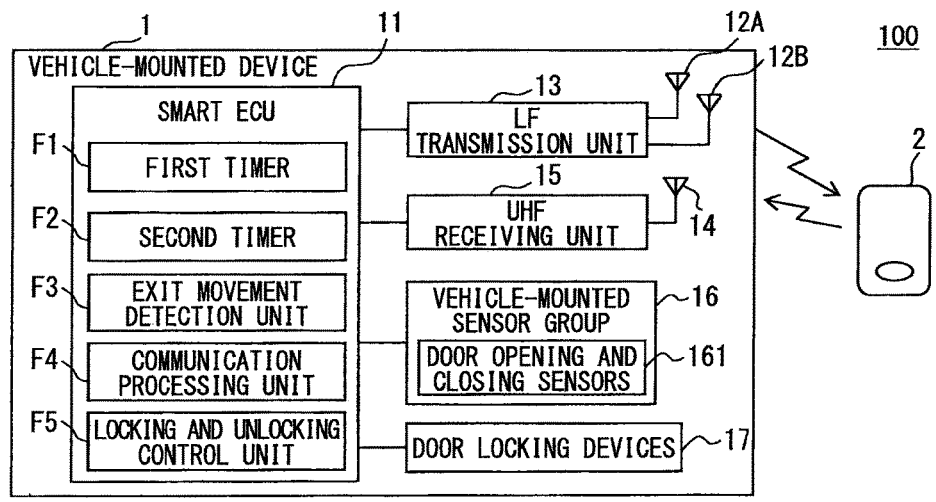
FIG. 1 is a block diagram illustrating an example of a schematic configuration of an electronic key system according to an embodiment of the present disclosure.

Hereinafter, embodiments of the present disclosure will be described with reference to the accompanying drawings. FIG. 1 is a diagram illustrating an example of a schematic configuration of an electronic key system 100 according to an embodiment. The electronic key system 100 includes a vehicle-mounted device 1 equipped to a vehicle and the mobile terminal 2 carried by a user. Hereinafter, a vehicle to which the vehicle-mounted device 1 is equipped is also referred to as a subject vehicle.

Each of the vehicle-mounted device 1 and the mobile terminal 2 has a so-called smart entry function, a so-called remote keyless entry function or the like which is executed on the basis of a successful matching between the vehicle-mounted device 1 and the mobile terminal 2 through a wireless communication. In the smart entry function, a control for locking or unlocking of the vehicle doors is executed. In the remote keyless entry function, a control for locking or unlocking of the vehicle doors, etc., in response to a user's operation made on a push switch 25 provided to the mobile terminal 2 is executed.

As an example, the vehicle-mounted device 1 transmits a signal to the mobile terminal 2 with the use of a radio wave of an LF (low frequency) band, and the mobile terminal 2 transmits the signal to the vehicle-mounted device 1 with the use of a radio wave of a UHF (ultra high frequency) band. For another example, a communication for the signal transmission from the vehicle-mounted device 1 to the mobile terminal 2 may perform within a frequency band other than the LF band, and a communication for the signal transmission from the mobile terminal 2 to the vehicle-mounted device 1 may perform within a frequency band other than the UHF band.

In the present embodiment, an example in which the electronic key system 100 is applied to the vehicle having a vehicle engine as a travelling power source will be described below. The travelling power source is not limited to the engine. The present disclosure may also be applied to vehicle with a motor or the combination of the engine and the motor as the travelling power source. Hereinafter, a configuration and operation of the electronic key system 100 will be described.

(Configuration of Vehicle-Mounted Device 1)

As illustrated in FIG. 1, the vehicle-mounted device 1 includes a smart ECU 11, an interior antenna 12A disposed in a vehicle compartment, an exterior antenna 12B disposed out of the vehicle compartment, an LF transmission unit 13, a UHF antenna 14, a UHF receiving unit 15, a vehicle-mounted sensor group 16, and door locking devices 17.

The smart ECU 11, the LF transmission unit 13, the UHF receiving unit 15, the vehicle-mounted sensor group 16, and the door locking devices 17 are connected to each other through an in-vehicle LAN in a communicable manner. Each of the interior antenna 12A and the exterior antenna 12B is connected to the LF transmission unit 13 through a known power feeding line (coaxial cable or the like). The UHF antenna 14 is connected to the UHF receiving unit 15 through a power feeding line.

Each of the interior antenna 12A and the exterior antenna 12B is a transmission antenna that radiates an electric signal received from the LF transmission unit 13 as a radio wave of an LF band (for example, 134 kHz). Hereinafter, the interior antenna 12A and the exterior antenna 12B are represented as LF antennas 12 when the antennas have no need to be distinguished from each other.

The interior antenna 12A is an antenna for transmitting a signal to the mobile terminal 2 disposed in the vehicle compartment. Therefore, the interior antenna 12A may be installed at a predetermined position in the vehicle compartment so that the radio wave radiated from the subject antenna is not leaked to a vehicle exterior and an area (blind spot) where the radio wave cannot reach does not exist in the vehicle interior. For example, the interior antenna 12A may be installed in the vicinity of a center console between a driver's seat and a front passenger's seat.

In FIG. 1, for convenience, only one interior antenna 12A is drawn. In practical use, one or more interior antennas 12A may be provided. The same is applied to the exterior antenna 12B.

The exterior antenna 12B is an antenna for transmitting a signal to the mobile terminal 2 disposed outside of the vehicle. Therefore, the exterior antenna 12B may be installed at a predetermined position so that a reachable range of the radio wave radiated from the antenna is equal to a preliminarily designed range around the vehicle exterior. For example, the exterior antenna 12B may be installed in the vicinity of each door handle (including an inside portion of each handle) so that an area within 1 m from each door handle outside of the vehicle is set as the reachable range.

Herein, the reachable range of the radio wave represents an area within which the radio wave radiated from the antenna is received by the mobile terminal 2 at a demodulatable signal level.

The LF transmission unit 13 modulates a baseband signal input from the smart ECU 11 and outputs the modulated baseband signal to the LF antennas 12. The signal input to the LF antennas 12 is radiated into a space as the radio wave of the LF band. The LF transmission unit 13 corresponds to a vehicle side transmission unit.

The LF transmission unit 13 includes, for example, a selection circuit that selects any LF antenna 12 for radiating the radio wave from the multiple LF antennas 12. The LF transmission unit 13 also includes a known modulation circuit for modulating the baseband signal to a carrier wave signal. The LF antenna 12 for radiating the radio wave among the multiple LF antennas 12 may be determined on the basis of a control signal input from the smart ECU 11. With the above configuration, the radio wave corresponding to the baseband signal input from the smart ECU 11 is radiated from the LF antenna 12 selected by the selection circuit.

The UHF antenna 14 converts the radio wave of the UHF band into an electric signal and outputs the converted electric signal to the UHF receiving unit 15. For example, the UHF antenna 14 receives the radio wave having a frequency within a range of 300 MHz to 400 HMz. The UHF antenna 14 may be installed at a predetermined position appropriately designed in the vehicle. At least one UHF antenna 14 may be installed.

The UHF receiving unit 15 demodulates the signal received by the UHF antenna 14 and outputs the demodulated signal to the smart ECU 11. The UHF receiving unit 15 corresponds to a vehicle side receiving unit.

The vehicle-mounted sensor group 16 is a group of sensors equipped to the subject vehicle, and detect various state amounts related to the subject vehicle. The vehicle-mounted sensor group 16 includes, for example, a vehicle speed sensor for detecting a travel speed of the subject vehicle, a shift position sensor, a parking brake sensor, door opening and closing sensors 161, and so on.

The shift position sensor detects a position of a shift lever. Positions of the shift lever include a parking position set at the time of parking the vehicle, and so on. The parking brake sensor detects an operation state (ON/OFF) of a parking brake.

The door opening and closing sensors 161 are equipped to respective doors of the subject vehicle, and each of the door opening and closing sensors 161 detects opening or closing state of the corresponding door. The various state amounts detected by the respective sensors provided in the vehicle-mounted sensor group 16 such as the detection result of the door opening and closing sensor 161 are successively output to the smart ECU 11 (for example, at 100 milliseconds intervals).

The vehicle-mounted sensor group 16 may include at least the door opening and closing sensors 161, and is not always provided with all of the sensors described above. Further, the sensors provided in the vehicle-mounted sensor group 16 are not limited to above-described sensors.

Each of the door locking devices 17 locks or unlocks the door on the basis of instruction from the smart ECU 11. The door locking devices 17 are provided to the respective doors of the subject vehicle.

The smart ECU 11 is provided by a computer, and includes well-known components, such as a CPU, an I/O, a volatile memory such as a RAM, a ROM, a rewritable nonvolatile memory, and a bus line that connects those components to each other. The ROM stores an ID code used in determination of whether the mobile terminal 2 is an authentication mobile terminal associated with the subject vehicle or not, and also stores programs for executing various processes.

The smart ECU 11 controls the CPU to execute the programs stored in the ROM, to thereby function as a first timer F1, a second timer F2, an exit movement detection unit F3, a communication processing unit F4, and a locking and unlocking control unit F5. A part or all of the functions to be executed by the smart ECU 11 may be configured by one or more integrated circuits (IC) in a hardware manner.

The first timer F1 and the second timer F2 are functions (that is, timer function) for measuring an elapse of a time period. The first timer F1 determines whether a predetermined first time period has elapsed or not. The second timer F2 determines whether a predetermined second time period longer than the first time period has elapsed or not.

The first time period is a period of time used as a reference for determining whether the user (who carries the mobile terminal 2) is willing to stay around the subject vehicle, and may be set to a reference value of 30 seconds as an example in the present embodiment, and it is determined that the user is willing to stay around the subject vehicle when the user is still positioned within the periphery of the vehicle after the first time period has elapsed. In the case where the user stays around the subject vehicle, the user may talk with a friend around the subject vehicle or refuel a fuel. In this example, the periphery of the subject vehicle represents an area (that is, reachable range) reachable by the radio wave radiated from the exterior antenna 12B.

The first time period is not limited to 30 seconds. Alternatively, the first time period may be set to a period of time shorter than 30 seconds such as 20 seconds, or a period of time longer than 30 seconds such as one minute. The first time period is properly set to be longer than an estimated period of time required for the user to close the door and leave the periphery of the subject vehicle after getting off the subject vehicle. Further, it is preferable that the first time period is set to be sufficiently shorter than an estimated period of time required for the user, who is willing to stay around the subject vehicle, to complete an errand around the subject vehicle immediately after the getting off the subject vehicle. In view of the above circumstances, it is preferable that the first time period is set to be equal to or longer than 20 seconds and equal to or shorter than 3 minutes.

The second time period is a period of time sufficiently longer (for example, 10 times or more than 10 times) than a transmission period (in this example, 200 milliseconds) which will be described later. Also, the second time period may be appropriately set on the basis of an estimated period of time required for the user to complete the errand around the subject vehicle and leaves the periphery of the subject vehicle. In the present embodiment, the second time period is set to a reference value of five minutes as an example. It is needless to say that the second time period may be set to another value, for example, one minute, three minutes, seven minutes, ten minutes, or 15 minutes. Also, it is preferable that the second time period is set to be longer than the first time period.

The first timer F1 and the second timer F2 may measure the elapse of the time by, for example, counting up clock signals output by a clock oscillation circuit. When the first time period elapses after the measurement starts, the first timer F1 outputs a signal (referred to as a first time period elapse signal) indicating that the first time period has elapsed. When the second time period elapses after the measurement starts, the second timer F2 outputs a signal (referred to as second time period elapse signal) indicating that the second time period has elapsed. The first timer F1 corresponds to a first time period measuring unit, and the second timer F2 corresponds to a second time period measuring unit.

The exit movement detection unit F3 determines whether the user has gotten off the vehicle or not. In the present embodiment, as an example, the exit movement detection unit F3 determines that the user has gotten off the vehicle when the door opening and closing sensors 161 detect that all of the doors are closed from a state where at least one door is opened.

Figure 3:
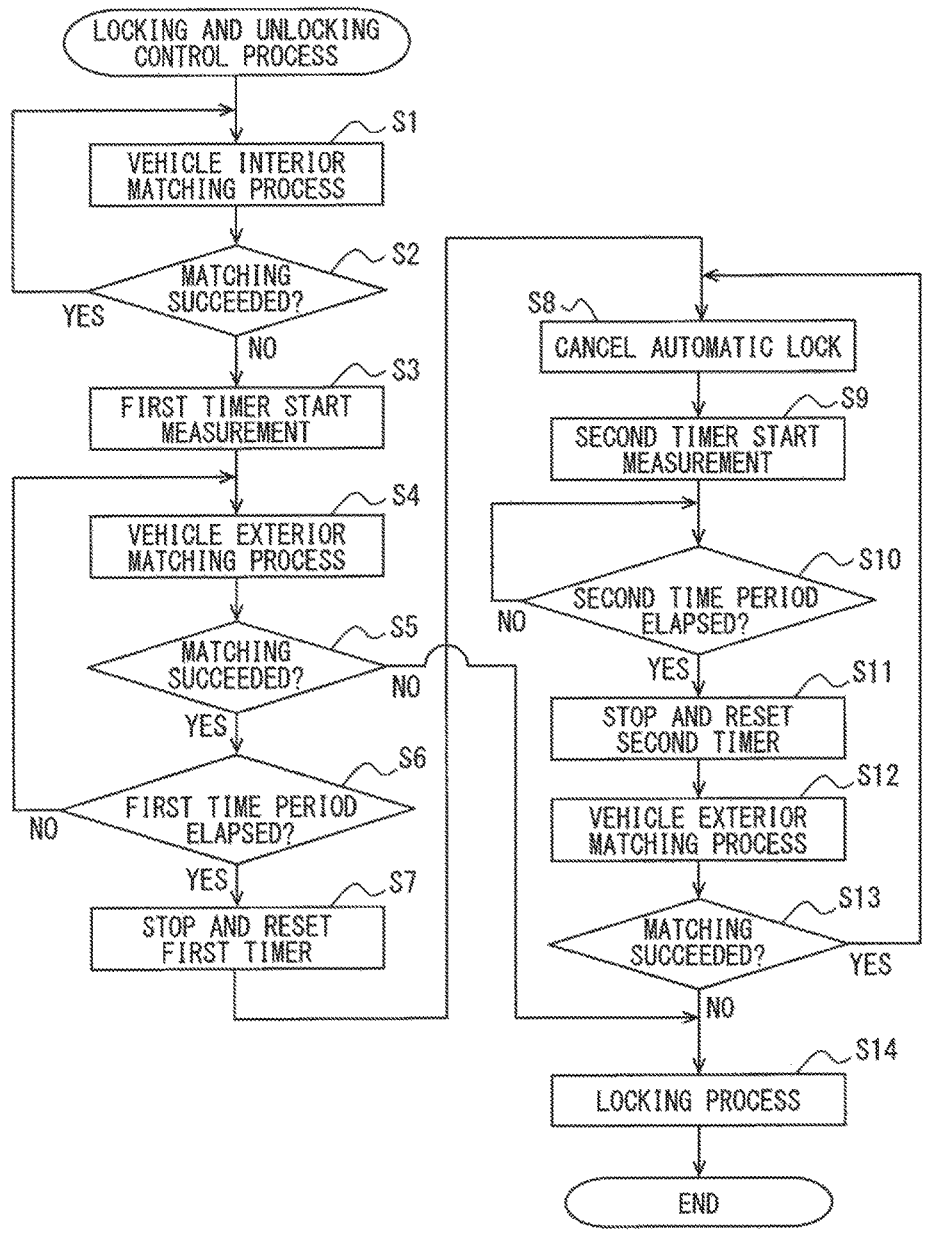
FIG. 3 is a flowchart illustrating a locking control process executed by a smart ECU.

Meanwhile, as another configuration, the exit movement detection unit F3 may determine that the user has gotten off the vehicle when at least one door is opened after an ignition power supply is turned off, and the door is then closed so that the vehicle enters a state where all of the doors are closed. In addition, after the vehicle interior matching process shown in FIG. 3 is executed, when it is determined that the mobile terminal 2 is not disposed in the vehicle interior, it may be determined that the user has gotten off the vehicle.

The detection that the user has gotten off the vehicle corresponds to the detection of the exit movement of the user. In other words, the exit movement detection unit F3 detects the user's exit movement The communication processing unit F4 controls the operation of the LF transmission unit 13 and the UHF receiving unit 15, and executes a communication with the mobile terminal 2. In more detail, when a state of the subject vehicle detected by the vehicle-mounted sensor group 16 satisfies a matching execution condition to be described later, the communication processing unit F4 generates a signal (transmission signal) to be transmitted to the mobile terminal 2 and outputs the generated signal to the LF transmission unit 13. The transmission signal includes a wakeup request signal for shifting the mobile terminal 2 from a sleep mode to a activation mode and a matching request signal that requests the mobile terminal 2 to return a matching response signal including the ID code, and so on. Each of the wakeup request signal and the matching request signal corresponds to the response request signal.

Also, the communication processing unit F4 acquires a signal received by the UHF receiving unit 15. In other words, the communication processing unit F4 acquires a wakeup response signal, a matching response signal or the like, which are returned from the mobile terminal 2.

The locking and unlocking control unit F5 controls the operation of the door locking devices 17. In other words, the locking and unlocking control unit F5 outputs, to the door locking devices 17, controls signals for giving instructions to switch the doors from the unlocked state to the locked state, and to switch the doors from the locked state to the unlocked state.

The smart ECU 11 executes a process related to the smart entry function described above according to the programs stored in the ROM. In other words, when a predetermined matching execution condition is satisfied, for example, when the subject vehicle is in a parked state, the smart ECU 11 executes the matching process through the wireless communication with the mobile terminal 2 to lock or unlock the doors of the subject vehicle.

The matching execution condition may be appropriately designed according to the control target (door locking/unlocking control and so on) to be executed on the basis of a successful result of the matching process. For example, the matching process for unlocking the doors may be successively executed in a predetermined transmission period (for example, 200 milliseconds) when the vehicle is in a parked state and all of the doors are locked. An execution time of the matching process for locking the doors will be described later with reference to FIG. 3.

A flowchart of the matching process to be executed by the smart ECU 11 will be described below. In other words, the communication processing unit F4 of the smart ECU 11 generates the wakeup request signal, and successively transmits the generated wakeup request signal from the respective LF antennas 12. When the communication processing unit F4 receives the wakeup response signal returned from the mobile terminal 2 in response to the wakeup request signal, the communication processing unit F4 allows the LF transmission unit 13 to transmit the matching request signal to the mobile terminal 2.

When the communication processing unit F4 receives the matching response signal in response to the matching request signal, the communication processing unit F4 executes matching process to determine whether the ID code included in the matching response signal is an authentication ID code or not. When the ID code included in the matching response signal is the authentication ID code, the matching is successful. On the other hand, when the ID code included in the matching response signal is not the authentication ID code, or when the communication processing unit F4 cannot receive the wakeup response signal or the matching response signal, the matching is considered to be in failure.

The smart ECU 11 executes the above-described remote keyless entry function and the like in addition to the above-described smart entry function in cooperation with the mobile terminal 2.

(Configuration of Mobile Terminal 2)

Figure 2:
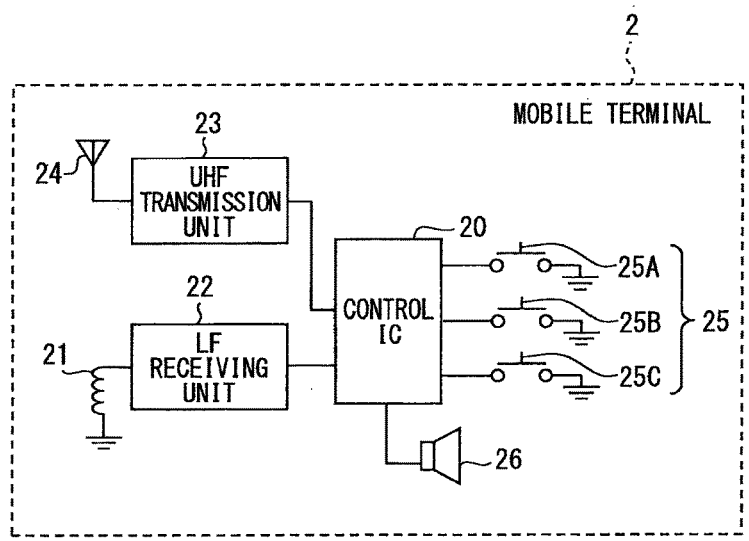
FIG. 2 is a block diagram illustrating an example of a schematic configuration of a mobile terminal.

As illustrated in FIG. 2, the mobile terminal 2 includes a control IC 20, an LF reception antenna 21, an LF receiving unit 22, a UHF transmission unit 23, a UHF transmission antenna 24, a push switch 25, and a speaker 26. The control IC 20 is connected with the LF receiving unit 22, the UHF transmission unit 23, the push switch 25, and the speaker 26 so as to be communicable with each other. The LF receiving unit 22 is connected with the LF reception antenna 21, and the UHF transmission unit 23 is connected with the UHF transmission antenna 24.

In the present embodiment, the mobile terminal 2 is a compact size mobile device normally used in a general electronic key system. As another configuration, the mobile terminal 2 may be configured by a well-known smartphone or tablet terminal, a wristwatch type or eyeglass type communication terminal (so-called wearable device), or the like.

The LF reception antenna 21 is an antenna for receiving the signal of the LF band. The LF reception antenna 21 receives the radio wave of the LF band (for example, 134 kHz), converts the radio wave into an electric signal, and outputs the converted electric signal to the LF receiving unit 22. The LF receiving unit 22 demodulates the signal input from the LF reception antenna 21 and outputs the demodulated signal to the control IC 20.

The UHF transmission unit 23 modulates the baseband signal input from the control IC 20 into a carrier wave signal of the UHF band, and outputs the modulated carrier wave signal to the UHF transmission antenna 24. The UHF transmission antenna 24 converts the signal input from the UHF transmission unit 23 into a radio wave of the UHF band (in particular, 300 to 400 MHz band) and radiates the converted radio wave.

The push switch 25 is a switch for using mainly the remote keyless entry function. As one example, as illustrated in FIG. 2, the push switch 25 includes multiple push switches 25A to 25C.

For example, the push switch 25A may be subjected to one-push operation made by the user. In this configuration, the push switch 25A transmits a signal for giving an instruction to lock all of the doors to the vehicle-mounted device 1 through the UHF transmission unit 23. The vehicle-mounted device 1 that has received the signal locks all of the doors. In other words, the user can bring the door locking devices 17 for all of the doors into the locked state by performing one-push operation on the push switch 25A.

When one-push operation is made on the push switch 25B, all of the doors may be unlocked, and when one-push operation is made on the push switch 25C, only a trunk door may be unlocked.

The control IC 20 may be provided by a known microcomputer, and includes a CPU, an I/O, a volatile memory such as a RAM, a nonvolatile memory, and a bus line that connect those components to each other. Programs for the control IC 20 to execute various process are stored in the nonvolatile memory.

The control IC 20 executes various processes on the basis of the programs stored in the nonvolatile memory to provide, for example, the smart entry function and the remote keyless entry function described above.

Meanwhile, the mobile terminal 2 has a sleep mode and an activation mode as the operation states. The sleep mode is a state in which an operation clock signal is not supplied to the control IC 20, and the function of the control IC 20 is in deactivated state.

When receiving the wakeup request signal in the sleep mode, the mobile terminal 2 shifts to the activation mode and returns, to the vehicle-mounted device 1, a response signal (that is, the wakeup response signal) to the wakeup request signal. When receiving the matching request signal in the activation mode, the mobile terminal 2 generates the matching response signal including the ID code and returns the generated matching response signal to the vehicle-mounted device 1.

The mobile terminal 2 also includes a time measurement function (that is, a timer) that operates with a clock as a reference signal. A measured value (count value) of the timer is used for determination of whether to shift from the activation mode to the sleep mode or not. When a state in which the signal is not received from the vehicle-mounted device 1 in the activation mode is continued for a predetermined period of time, and the count value of the timer reaches a predetermined value (expiration of time), the mobile terminal 2 shifts to the sleep mode.

(Locking Control Process)

The following will describe a series of procedures (locking control process) for switching the doors of the subject vehicle from the unlocked state to the locked state to be executed by the smart ECU 11 with reference to a flowchart illustrated in FIG. 3. For example, the flowchart illustrated in FIG. 3 may be started when the user's exit movement is detected by the exit movement detection unit F3. In other words, the flowchart may be started when it is detected by the door opening and closing sensors 161 that the state in which one or more doors are opened is switched to the state in which all of the doors are closed.

First, the vehicle interior matching is executed in step S1, and the process proceeds to step S2. The vehicle interior matching is a matching process executed by using the interior antenna 12A. Specifically, when the vehicle-mounted device 1 transmits the wakeup request signal from the interior antenna 12A and receives the wakeup response signal, the vehicle-mounted device 1 transmits the matching request signal from the interior antenna 12A. When receiving the matching response signal, the vehicle-mounted device 1 executes the matching with the use of the ID code included in the matching response signal.

In step S2, as a result of the vehicle interior matching process in step S1, it is determined whether the matching is succeeded or not. When the matching is succeeded, the determination in step S2 becomes YES, and the process returns to step S1. On the other hand, when the matching ends with failure, the determination in step S2 becomes NO, and the process proceeds to step S3.

That the matching is succeeded as a result of the vehicle interior matching process indicates that the mobile terminal 2 (user carries the mobile terminal) is present in the vehicle interior. On the other hand, that the matching is in failure as a result of the vehicle interior matching process indicates that the mobile terminal 2 is not present in the vehicle interior.

In step S3, the measurement of the elapsed time by the first timer F1 starts, and the process proceeds to step S4. In other words, the first timer F1 measures the elapsed time after the process shifts from step S2 to step S3. In a case where the user has actually exited from the vehicle, after step S1 is executed once followed by start of the process, the process proceeds to S3. As compared with the first time period, a period of time for executing step S2 is by once is substantially short and can be ignored.

Therefore, a counting start time of the elapsed time period measured by the first timer F1 can be considered as a time point at which the process has started. In other words, the counting start time of the elapsed time period measured by the first timer F1 can be considered as a time point at which the user's exit movement is detected by the exit movement detection unit F3. When the user does not actually get off the vehicle but stays in the vehicle compartment when the process starts, the first timer F1 starts to measure the elapsed time from the time point when the user actually moves to the vehicle exterior and a result of the vehicle interior matching becomes comes out as a failure. For that reason, the first timer F1 can measure the elapsed time from the time point when the user who carries the mobile terminal 2 actually gets off the vehicle.

In step S4, the vehicle exterior matching is executed, and the process proceeds to step S5. The vehicle exterior matching is a matching process using the exterior antenna 12B. In other words, when the vehicle-mounted device 1 transmits the wakeup request signal from the exterior antenna 12B and receives the wakeup response signal, the vehicle-mounted device 1 transmits the matching request signal from the exterior antenna 12B. When receiving the matching response signal, the vehicle-mounted device 1 executes the matching with the use of the ID code included in the matching response signal.

In step S5, it is determined whether a result of the vehicle exterior matching process in step S4 is succeeded or not. When the matching is succeeded, the determination in step S5 becomes YES, and the process proceeds to step S6. On the other hand, when the matching ends with failure, the determination in step S5 becomes NO, and the process proceeds to step S14.

The result of the vehicle exterior matching process is succeeded indicates that the mobile terminal 2 (user who carries the mobile terminal) is present around the subject vehicle. On the other hand, as a result of the vehicle exterior matching process, the failed matching indicates that the mobile terminal 2 is not present around the subject vehicle.

In step S6, it is determined whether the elapsed time after the process shifts from step S2 to step S3 reaches the first time period or not. Whether the first time period has elapsed after the process shifts from step S2 to step S3 or not, may be determined according to whether the first time period elapse signal has been output from the first timer F1 or not.

When the first time period has not yet elapsed after the process shifts from step S2 to step S3, the determination in step S6 becomes NO, and the process returns to step S4. On the other hand, when the first time period has elapsed after the process shifts from step S2 to step S3, the determination in step S6 becomes YES, and the process proceeds to step S7.

In executing the vehicle exterior matching process after returning from step S6 to step S4, it is preferable to execute a next vehicle exterior matching process at a predetermined time interval after the previous vehicle exterior matching process has been executed. That step S4 to step S6 are repetitively executed indicates that the vehicle exterior matching process is repetitively executed. When the vehicle exterior matching process is too frequently executed, a power consumption of the mobile terminal 2 is increased, and therefore such execution is not preferable.

With returning from step S6 to step S4, a period during which the vehicle exterior matching process of step S4 is repetitively executed may be preferably set to be equivalent to a period (that is, transmission period) by which the matching process for unlocking the doors is executed, or a period by which the matching process is executed in the conventional electronic key system.

The communication processing unit F4 adjusts the transmission time of the wakeup request signal so that the interval during which the vehicle exterior matching process is repetitively executed in step S4 becomes equal to the above-mentioned transmission period. The same is applied to the execution interval of the vehicle interior matching process in step S1. In other words, the communication processing unit F4 adjusts a time at which the communication processing unit F4 generates the transmission signal so that the vehicle interior matching process is also periodically executed at the transmission period.

In step S7, the first timer F1 is stopped, and the count value (that is, measured time) of the first timer F1 is reset. Upon completion of step S7, the process proceeds to step S8. In step S8, the door locking devices 17 are instructed to maintain the doors in the unlocked states, and the process proceeds to step S9.

In step S9, the measurement of the elapsed time by the second timer F2 starts, and the process proceeds to step S10. In other words, the second timer F2 measures the elapsed time after the process shifts from step S8 to step S9. In step S10, it is determined whether the elapsed time after shifting to step S9 reaches the second time period or not. Whether the second time period has elapsed after shifting to step S9 or not, may be determined according to whether the second time period elapse signal is output from the second timer F2 or not.

When the second time period has not yet elapsed after shifting to step S9, the determination in step S10 becomes NO, and the process executes step S10 again. In other words, step S10 is repeated until the second time period elapses. On the other hand, when the second time period has elapsed after shifting to step S9, the determination in step S10 becomes YES, and the process proceeds to step S11.

In step S11, the second timer F2 is stopped, the count value (that is, measured time) of the second timer F2 is reset, and the process proceeds to step S12. In step S12, similar to step S4, the vehicle exterior matching process is executed, and the process proceeds to step S13.

In step S13, it is determined whether a result of the vehicle exterior matching process is succeeded or not. When the matching is succeeded, the determination in step S13 becomes YES, and the process returns to step S8. In other words, step S8 to step S13 are repeated while the mobile terminal 2 is present around the subject vehicle, and the vehicle exterior matching process is periodically executed at the second time period.

On the other hand, when a result of the vehicle exterior matching process in step S12 is failure, the determination in step S13 becomes NO, and the process proceeds to step S14. In step S14, all of the doors of the subject vehicle are brought into the locked state, and the process is ended.

When the doors are locked by the user's operation or the engine is started during the execution of the above process, the process is forcedly terminated. In addition, when the opening and closing of the doors are detected by the door opening and closing sensors 161 during the execution of the process, the process may be newly executed from step S1.

Conclusion of the Embodiment

In the above configuration, by executing step S1 and step S2 first, it is determined whether the user stays in the vehicle interior or not. When the user is out of the vehicle (NO in step S2), the measurement by the first timer F1 starts.

When the user stays around the subject vehicle for the first time period after the user moves out of the vehicle compartment, the determination in step S6 becomes YES, and the doors are kept in the unlocked state under the control (step S8). After the user moves out of the vehicle, when the user leaves the periphery of the subject vehicle before the elapse of the first time period (NO in step S5), all of the doors are locked (step S14).

In general, when the user is not willing to stay around the subject vehicle and leaves the periphery of the subject vehicle in a relatively short time, the determination in step S5 becomes NO, and the doors are promptly locked (step S14).

When the user is willing to stay in the vicinity of the vehicle due to a standing talking with a friend or a refueling work or the like, the user stays around the vehicle of the subject vehicle for the first time period or longer. Thus, the determination in step S6 becomes YES, and the doors are kept in the unlocked state. Therefore, even when the user is going to get on the subject vehicle after the first time period has elapsed, the user can open the door without performing the unlocking operation.

After the elapse of the first time period, the vehicle exterior matching is executed every time (step S12) in response to the elapse of the second time period (YES in step S10). Therefore, with the vehicle exterior matching process being executed, a frequency at which the mobile terminal 2 transmits the response signal can be suppressed. In other words, the power consumption of the mobile terminal 2 can be suppressed.

When the matching is in failure as a result of the vehicle exterior matching process in step S12, the doors are locked (step S14). Therefore, even when the user leaves the periphery of the subject vehicle without performing the door locking operation after exiting from the subject vehicle, the doors are locked within the second time period after the user has leaved the periphery of the subject vehicle.

That is, according to the above configuration, both the security performance of the vehicle and the convenience of the user can be performed while the power consumption of the mobile terminal 2 is suppressed. The amount of battery consumption of the mobile terminal 2 can be more effectively suppressed when the second time period is set to be a longer duration. However, after the user exits from the vehicle, when the user leaves the periphery of the subject vehicle after the elapse of the first time period, a time period until the activation of the automatic door lock increases to a relatively long period. Therefore, the second time period is preferably set to 15 minutes or shorter.

The embodiments of the present disclosure have been described above. However, the present disclosure is not limited to the above-described embodiments, and the following embodiments also fall within the technical scope of the present disclosure. Further, the present disclosure can be implemented with various changes without departing from the spirit of the present disclosure, aside from the following modifications.

(Modification 1)

In the above embodiment, the first time period and the second time period are set to the constant values, but the time periods are not limited to constant values. For example, when the vehicle-mounted sensor group 16 is provided with a filler neck opening and closing sensor (not shown) that detects an opening and closing state of the filler neck for refueling the fuel (for example, gasoline), a length of the first time period may be changed from a predetermined reference value on the basis of the detection result of the filler neck opening and closing sensor.

In more detail, when it is detected by the filler neck opening and closing sensor that the filler neck is opened at a time point when the user's exit movement is detected by the exit movement detection unit F3 or at a time point when the first time period elapses (YES in step S6), the first time period may be set to be shorter than the reference value. For example, when the reference value is 30 seconds, the first time period may be shorter than the reference value, for example, set to 20 seconds, 10 seconds, or 0 seconds.

This is because that the opening of the filler neck indicates that a purpose for user's exit movement the vehicle is to refuel, and a possibility that the user is willing to stay around the subject vehicle is relatively high. As described above, the first time period has a function of determining whether the user promptly leaves the periphery of the subject vehicle or stays around the subject vehicle.

Therefore, when the possibility that the user is willing to stay around the subject vehicle is high, the first time period may be set to be shorter, and further may be omitted. In addition, because the response signals are transmitted to the mobile terminal 2 at the transmission intervals during the first time period, a battery of the mobile terminal 2 is consumed. Therefore, from the viewpoint of suppressing the power consumption of the mobile terminal 2, the first time period may be set as short as possible.

In other words, according to the configuration of Modification 1, it can be more suitably supposed that the user is willing to stay around the subject vehicle. Further, on the basis of the supposition, the first time period is set to be shorter, thereby suppressing the power consumption of the mobile terminal 2 more effectively.

In addition, when the purpose for user's exit movement the vehicle is to refuel, a possibility that the user returns to the vehicle interior as soon as the refuel is completed is high, and a possibility that the user leaves the periphery of the vehicle for a long time is relatively low. In other words, a need to lock the doors of the vehicle is relatively low.

Therefore, when it is detected by the filler neck opening and closing sensor that the filler neck is opened at the time point when the user's exit movement is detected by the exit movement detection unit F3 or at the time point when the first time period elapses, the second time period may be set to be longer than a predetermined reference value.

(Modification 2)

Further, in Modification 1, the smart ECU 11 may estimate a period of time required to refuel from a remaining fuel level remaining in the fuel tank, and determine the second time period on the basis of the estimated result. For example, when the period of time required to refuel is longer than the reference value of the second time, the second time period may be set to be longer than the reference value by a predetermined period of time. For example, the second time period may be set as a time obtained by adding a constant margin duration (for example, one minute) to the period of time required to refuel.

The period of time required to refuel in this example represents, for example, a period of time required until the fuel tank is filled with fuel from the current remaining fuel level. For example, the smart ECU 11 may estimate the period of time required to refuel from the current remaining fuel level with reference to data indicative of a correspondence relationship between the fuel remaining level and the period of time required to refuel, which is prepared in advance.

It is noted that a flowchart or the processing of the flowchart in the present disclosure includes sections (also referred to as steps), each of which is represented, for instance, as S1. Further, each section can be divided into several sub-sections while several sections can be combined into a single section. Furthermore, each of thus configured sections can be also referred to as a circuit, device, module, or means.

Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A vehicle-mounted device equipped to a vehicle, comprising:
    a vehicle side transmission unit that transmits, to a mobile terminal carried by a user, a response request signal requesting for a response;
    a vehicle side receiving unit that receives a response signal transmitted from the mobile terminal as the response to the response request signal;
    an exit movement detection unit that detects an exit movement of the user;
    a locking and unlocking control unit that controls locking and unlocking of a door of the vehicle; and
    a first timer that measures a first time period preliminarily set to be longer than an estimated time period required for the user to leave a periphery of the vehicle after exiting from the vehicle, wherein
    the first timer starts a measurement of the first time period at a time point when the exit movement of the user is detected by the exit movement detection unit as a counting start time,
    before an elapse of the first time period,
        the vehicle side transmission unit periodically transmits the response request signal at a transmission period that is preliminarily set,
        the locking and unlocking control unit keeps the door in an unlocked state while the vehicle side receiving unit receives the response signal,
        the locking and unlocking control unit locks the door when the vehicle side receiving unit is incapable of receiving the response signal, and
        the locking and unlocking control unit keeps the door in the unlocked state when the vehicle side receiving unit is capable of receiving the response signal at a time point corresponding to the elapse of the first time period, and
    after the elapse of the first time period,
        the vehicle side transmission unit periodically transmits the response request signal at a second time period which is set to be longer than the transmission period,
        the locking and unlocking control unit keeps the door in the unlocked state while the vehicle side receiving unit receives the response signal, and
        the locking and unlocking control unit locks the door when the vehicle side receiving unit is incapable of receiving the response signal.

2. The vehicle-mounted device according to claim 1, further comprising
    a second timer that measures the second time.

3. The vehicle-mounted device according to claim 1, further comprising
    a filler neck opening and closing sensor that detects opening and closing of a filler neck which enables refueling of a fuel tank of the vehicle with fuel, wherein,
    when the filler neck opening and closing sensor detects an opening of the filler neck, the first time period is set to be shorter than a predetermined reference value and the second time period is set to be longer than the predetermined reference value.

4. The vehicle-mounted device according to claim 1, wherein
    the second time period is set to be longer than the first time period.

5. The vehicle-mounted device according to claim 1, wherein
    the first time period is set to be equal to or longer than 20 seconds and equal to or shorter than 3 minutes, and
    the second time period is set to be equal to or longer than ten times of the transmission period and equal to or shorter than 15 minutes.

6. The vehicle-mounted device according to claim 1, wherein
    the vehicle side transmission unit transmits a wakeup request signal as the response request signal, and further transmits a matching request signal as the response request signal when the response signal responsive to the wakeup request signal is returned, the vehicle-mounted device executes a matching between the subject device and the mobile terminal based on the response signal when the vehicle side receiving unit receives the response signal responsive to the matching request signal,
the locking and unlocking control unit keeps the door in the unlocked state when the matching is succeeded, and
the locking and unlocking control unit locks the door when the matching is failed or the locking and unlocking control unit fails to receive the response to at least any one of the wakeup request signal or the matching request signal.

* * * * *